(12) United States Patent
Olwal

(10) Patent No.: US 11,049,446 B2
(45) Date of Patent: Jun. 29, 2021

(54) CHROMATICS AND ILLUMINATION FOR NON-EMISSIVE DISPLAYS

(71) Applicant: Google LLC, Mountain View, CA (US)

(72) Inventor: Alex Olwal, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/541,484

(22) Filed: Aug. 15, 2019

(65) Prior Publication Data

US 2020/0111411 A1 Apr. 9, 2020

Related U.S. Application Data

(60) Provisional application No. 62/740,659, filed on Oct. 3, 2018.

(51) Int. Cl.
| | | |
|---|---|---|
| *G06F 1/00* | (2006.01) |
| *G09G 3/3225* | (2016.01) |
| *G02F 1/1335* | (2006.01) |
| *G02F 1/1333* | (2006.01) |
| *G02F 1/1347* | (2006.01) |
| *G04G 9/00* | (2006.01) |

(52) U.S. Cl.
CPC ......... *G09G 3/3225* (2013.01); *G02F 1/1347* (2013.01); *G02F 1/13338* (2013.01); *G02F 1/133524* (2013.01); *G02F 1/133528* (2013.01); *G02F 2201/44* (2013.01); *G02F 2201/56* (2013.01); *G04G 9/007* (2013.01); *G09G 2320/0626* (2013.01); *G09G 2354/00* (2013.01)

(58) Field of Classification Search
CPC ............ H04N 13/04; G09G 3/00; G09G 5/14; G09G 5/10; G06F 1/16; G06F 3/0482
See application file for complete search history.

(56) References Cited

U.S. PATENT DOCUMENTS

| | | | |
|---|---|---|---|
| 2010/0277779 A1* | 11/2010 | Futterer | G02F 1/1335 359/9 |
| 2016/0306328 A1 | 10/2016 | Ko et al. | |
| 2016/0342327 A1* | 11/2016 | Chi | G06F 3/04883 |
| 2017/0310956 A1* | 10/2017 | Perdices-Gonzalez | G09G 3/3208 |

\* cited by examiner

*Primary Examiner* — Michael A Faragalla
(74) *Attorney, Agent, or Firm* — Lerner, David, Littenberg, Krumholz & Mentlik, LLP

(57) ABSTRACT

Aspects of the technology provide a graphical display on a client device such as a smartwatch or other electronic display device. Content rendered by a non-emissive display element is augmented by an enhancement display element, for instance to change a color or illumination intensity of the content. The enhancement display element may include multiple illumination sources and light pipes that guide light from the light sources to specific regions along the display. Alternatively, the enhancement display element may be a transparent OLED or similar component, for instance to provide per-pixel illumination, highlighting and/or color enhancement to selected content items. In yet another configuration, the enhancement display element has a mask layer and a light element. The mask layer controls the amount of light reaching the non-emissive display element or viewable by a user. Each of these architectures provides rich enhancement to the content items generated by the non-emissive display element.

20 Claims, 13 Drawing Sheets

200

300

500

510

520

530

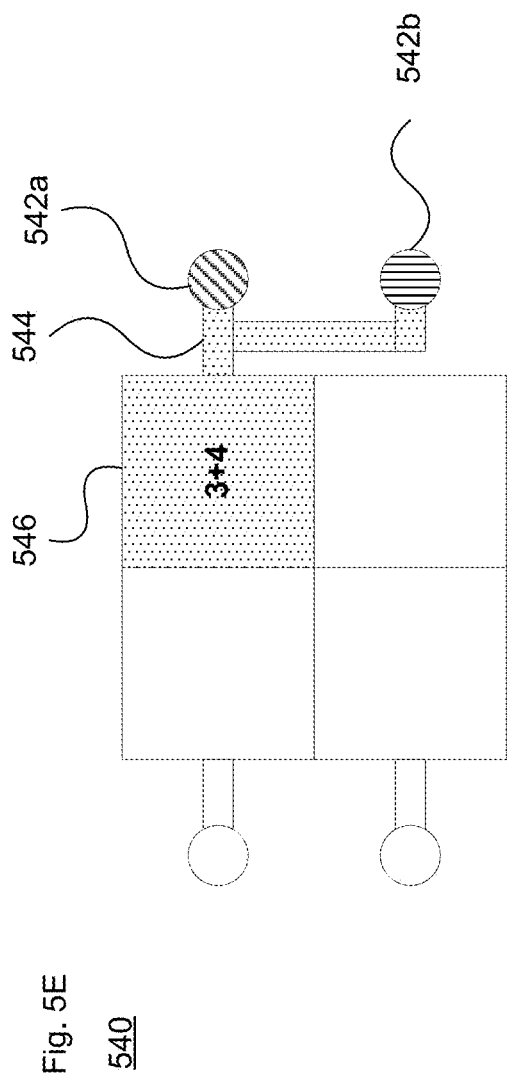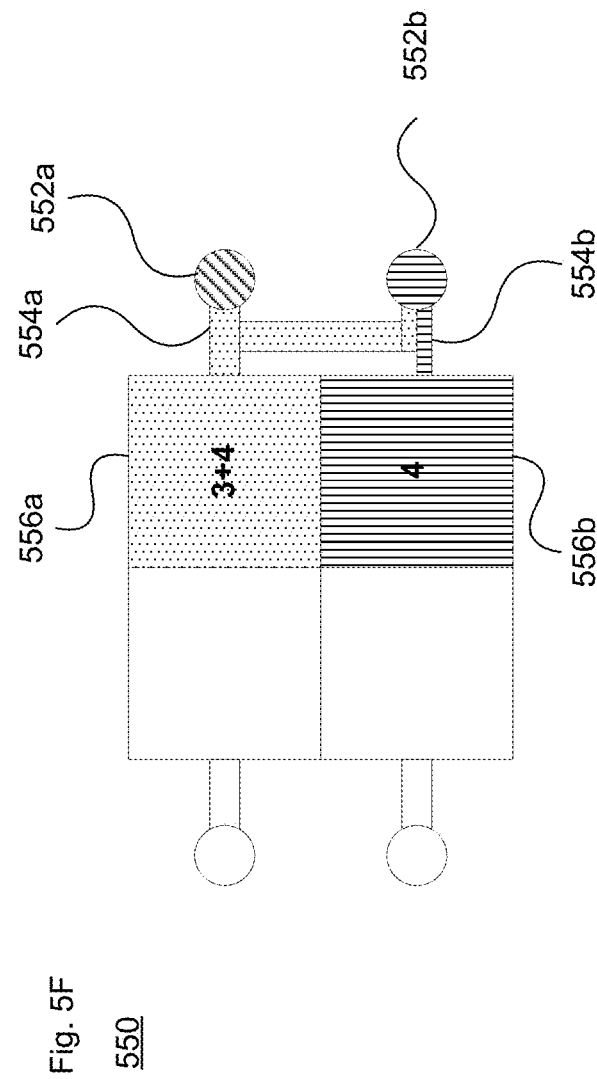
Fig. 5E 540
Fig. 5F 550

600

610

620

710

700

720

810

800

900

CHROMATICS AND ILLUMINATION FOR NON-EMISSIVE DISPLAYS

CROSS-REFERENCE TO RELATED APPLICATIONS

The present application claims the benefit of the filing date of U.S. Provisional Patent Application No. 62/740,659 filed Oct. 3, 2018, the disclosure of which is hereby incorporated herein by reference.

BACKGROUND

Personal information technology has rapidly evolved with the introduction of smartphones. Smartphones are nearly ubiquitous, but are being supplemented and in some instance replaced by other electronics. Wearable devices with smaller form factors have more recently been used to provide users with activity information, notifications and other functionality in a user-friendly manner. One type of wearable device that is becoming more and more popular is the smartwatch. In addition to telling time, smartwatches may run various apps and or perform in a manner similar to a smartphone. Thus, smartwatches can address the smartphone size issue, and may provide relevant information to a user in a more discreet manner than a smartphone.

BRIEF SUMMARY

Smartwatches may employ emissive displays, non-emissive displays, and in some situations both emissive and non-emissive displays. Both types of displays have different benefits and limitations.

Emissive displays are useful because they are able to provide high-resolution, full-color imagery at video frame rates, and do not require another light source for readability. However, existing light emitting displays may not effectively handle daylight visibility or otherwise provide sufficient contrast under certain conditions. Unnecessarily bright displays in a dimly lit place, such as a movie theater, can be distracting to the wearer and others nearby. The emitted light can cause eye strain with extended wearer interactions. In addition, emissive displays can be power hungry, using battery power just by being turned on.

In contrast, non-emissive displays are able to provide excellent readability in bright environments (e.g., outdoors), with high contrast and reduced eye strain relative to emissive displays. Certain non-emissive displays may have a limited refresh rate, or limited color depth or greyscale capability. The form factor of the display device may also limit options that provide visibly appealing interfaces. Nonetheless, there are many applications in which a non-emissive display is particularly beneficial when incorporated into a smart watch or other wearable. In various situations it may be unnecessary to provide per-pixel colorization or to illuminate the whole surface of the display device. Instead, localized or per-area control can be employed to colorize or highlight selected content or other information for the user. Aspects of the technology include various configurations that augment a non-emissive display in view of these factors.

The result is a robust architecture that provides beneficial content to the wearer, while saving power, reducing eye strain and minimizing distractions to others nearby.

According to one aspect of the technology, a smartwatch is configured to present content to a wearer. The smartwatch includes a housing, a user interface subsystem, a non-emissive display element, an enhancement display element and one or more processors. The housing has a first side and a second side opposite the first side, with the first side having a display area arranged to be viewable by the wearer during use. The user interface subsystem includes one or more actuator elements configured to receive input from the wearer. The non-emissive display element is disposed along a first area of the housing. The non-emissive display element is configured to present content to the wearer. The enhancement display element is disposed along a second area of the housing. The enhancement display element is configured to vary at least one of an illumination intensity or a color of content to be presented to the wearer. The enhancement display element is arranged closer to the first side of the housing than the non-emissive display element. The one or more processors are received within the housing and are operatively coupled to the user interface subsystem, the non-emissive display element and the enhancement display element. The one or more processors are configured to determine a content type for each one of a set of content items to be presented to the wearer, select at least one of the illumination intensity or the color for each one of the set of content items, cause the non-emissive display element to generate the set of content items, and cause the enhancement display element to vary one or both of the illumination intensity or color for at least one of the set of content items while the non-emissive display element generates the set of content items.

In one example, the enhancement display element comprises a plurality of light pipes and a plurality of illumination display elements. Each one of the plurality of light pipes is optically coupled to at least one of the plurality of illumination display elements. And each light pipe is configured to direct light to a selected portion of the display area. Here, the enhancement display element may provide at least one of binary illumination intensity control or binary color control over a selected portion of the display area. Alternatively, multiple ones of the plurality of illumination display elements are optically coupled to a given one of the plurality of light pipes. In this case, the one or more processors are configured to cause the enhancement display element to vary one or both of the illumination intensity or the color through additive or subtractive properties of the multiple illumination display elements. The one or more processors may be configured to route input from at least one of the illumination display elements to multiple portions of the display area. And the illumination display elements may comprise a front light element, a polarizer and one or more liquid crystal (LC) elements.

In another example, the enhancement display element comprises a transmissive display element configured to be transparent in a first mode and non-transparent in a second mode. Here, the one or more processors are configured to cause portions of the transmissive display element to change between the first mode and the second mode to vary one or both of the illumination intensity or the color for selected content to be presented along the display area. The transmissive display layer may comprise a transparent organic light emitting diode (OLED) layer. In this case, the transparent OLED may be configured to provide per-pixel illumination and color control for the selected content.

In a further example, the enhancement display element comprises a light layer and a mask layer, and the one or more processors are configured to cause the light layer and the mask layer to vary one or both of the illumination intensity or the color for selected content to be presented along the display area. In this case, the light layer may encompass an entirety of the display area, and the mask layer may be segmented into a plurality of non-overlapping or overlapping regions, each region associated with a respective portion of the display area. Here, the mask layer may comprise a liquid crystal (LC) element. In one alternative, the light layer may be disposed between the mask layer and the first side of the housing. In another alternative, the light layer may be disposed between the mask layer and the non-emissive display element.

According to another aspect of the technology, a method of operating a graphical display of a client device is provided. The graphical display including a non-emissive display element and an enhancement display element. The enhancement display element is arranged between the non-emissive display element and a viewable side of the client device defining a display area. The method comprises determining, by one or more processors of the client device, a content type for each one of a set of content items to be presented for viewing along the display area; selecting, by the one or more processors, at least one of an illumination intensity or a color for each one of the set of content items; causing, by the one or more processors, the non-emissive display element to generate the set of content items for display; and causing, by the one or more processors, the enhancement display element to vary one or both of the illumination intensity or the color for at least one of the set of content items while the non-emissive display element generates the set of content items.

In one example, the enhancement display element provides at least one of binary illumination intensity control or binary color control over a selected portion of the display area. In another example, the enhancement display element comprises a plurality of illumination display elements. Here, causing the enhancement display element to vary one or both of the illumination intensity or the color includes causing selected ones of the plurality of illumination elements to vary one or both of the illumination intensity or the color through additive or subtractive properties of the selected ones of the plurality of illumination display elements. In a further example, causing the enhancement display element to vary one or both of the illumination intensity or the color includes routing input from at least one illumination display element to multiple portions of the display area.

In yet another example, the enhancement display element comprises a transmissive display element configured to be transparent in a first mode and non-transparent in a second mode. Here, causing the enhancement display element to vary one or both of the illumination intensity or the color includes causing portions of the transmissive display element to change between the first mode and the second mode to vary one or both of the illumination intensity or the color for selected content to be presented along the display area.

And in another example, the enhancement display element comprises a light layer and a mask layer. In this case, causing the enhancement display element to vary one or both of the illumination intensity or the color includes causing the light layer and the mask layer to vary one or both of the illumination intensity or the color for selected content to be presented along the display area.

BRIEF DESCRIPTION OF THE DRAWINGS

FIGS. 5A-5F illustrate examples of light or color distribution in accordance with aspects of the disclosure in view of FIG. 4A.

DETAILED DESCRIPTION

Overview

The technology provides robust architectures to augment or otherwise enhance content generated with a non-emissive display. One aspect involves computationally adding per-area color to a non-emissive display surface. Another aspect partially illuminates the non-emissive display surface based on the user's needs.

Example System

Figure 1:
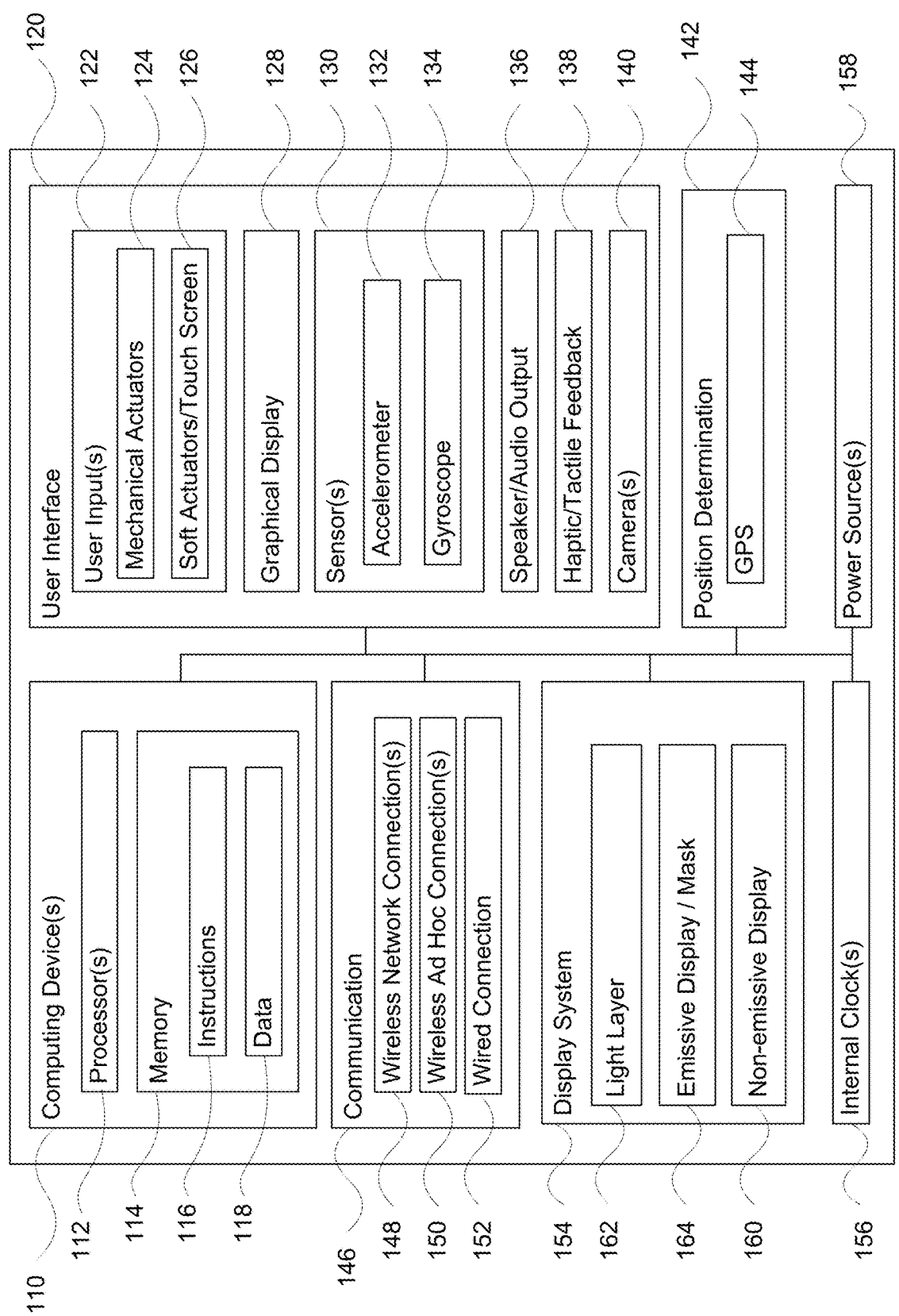
FIG. 1 is a functional diagram of an example symbiotic display smartwatch in accordance with aspects of the disclosure.

As shown in FIG. 1, a smartwatch 100 in accordance with aspects of the disclosure includes various components. The smartwatch 100 may have one or more computing devices, such as computing device 110 containing one or more processors 112, memory 114 and other components typically present in a smartphone or other personal computing device. The one or more processors 112 may be processors such as commercially available CPUs. Alternatively, the one or more processors may be a dedicated device such as an ASIC, a single or multi-core controller, or other hardware-based processor.

The memory 114 stores information accessible by the one or more processors 112, including instructions 116 and data 118 that may be executed or otherwise used by each processor 112. The memory 114 may be, e.g., a solid state memory or other type of non-transitory memory capable of storing information accessible by the processor(s), including write-capable and/or read-only memories.

The instructions 116 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in detail below.

The data 118 may be retrieved, stored or modified by processor 112 in accordance with the instructions 116. As an example, data 118 of memory 114 may store predefined scenarios. A given scenario may identify a set of scenario requirements including which display layer(s) will present selected content.

User interface 120 includes various I/O elements. For instance, one or more user inputs 122 such as mechanical actuators 124 and/or soft actuators 126 are provided. The mechanical actuators 124 may include a crown, buttons, switches and other components. The soft actuators 126 may be incorporated into a touchscreen cover, e.g., a resistive or capacitive touch screen. Also part of the user interface 120 is a graphical display 128. Content items to be presented by the graphical display 128 are generated via enhanced non-emissive display architectures, which are discussed in detail below.

Figure 2:
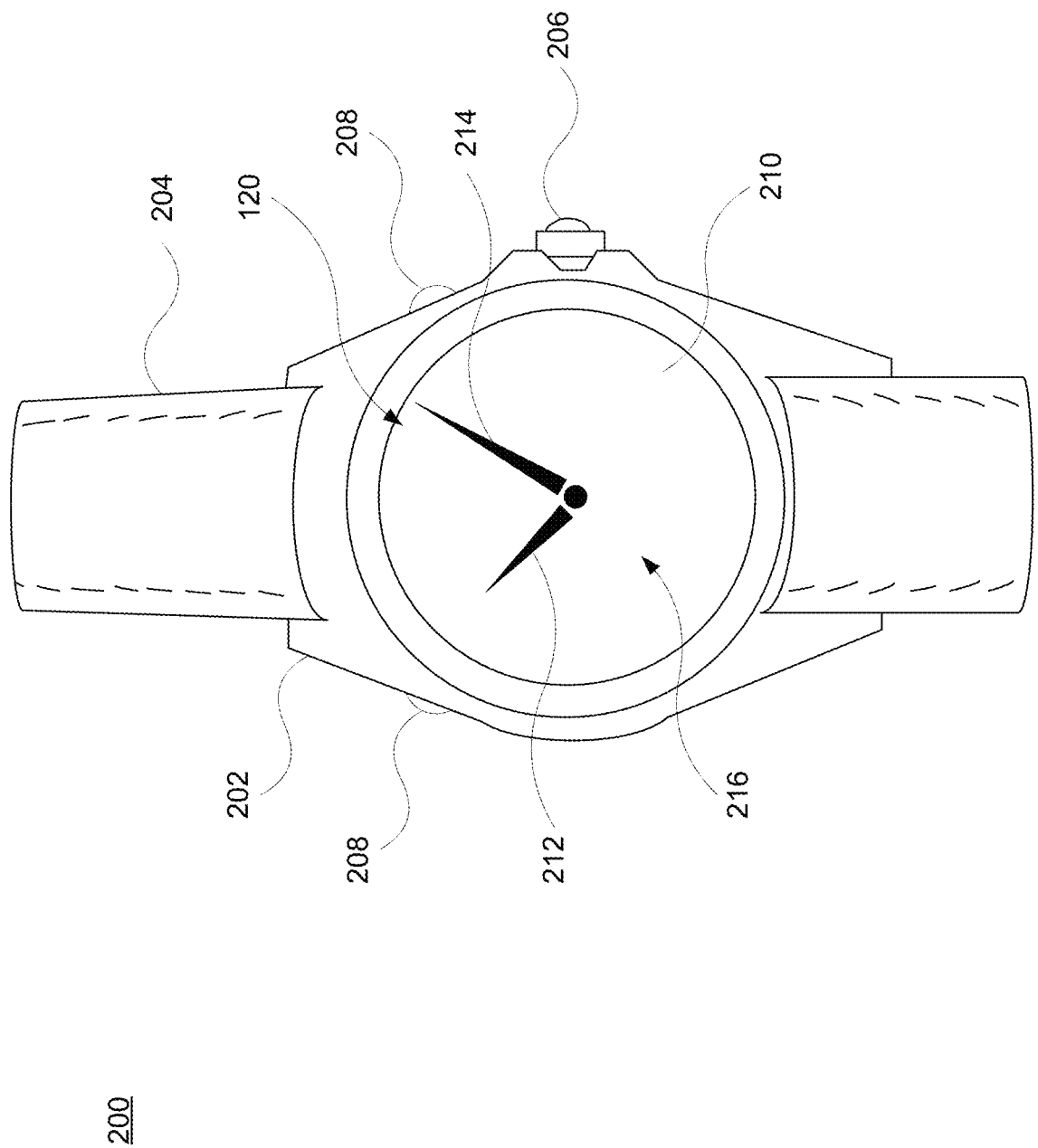
FIG. 2 illustrates an example smartwatch in accordance with aspects of the disclosure.

An example watch configuration 200 with such a user interface 120 is shown in FIG. 2. The example watch configuration 200 includes a watch housing 202 and a band 204 connected thereto. The mechanical actuators here include crown 206 and a pair of supplemental buttons 208. The number of mechanical actuators may vary, and may be more or less than the number shown. Actuators may be located on the band 204 in addition to or in place of actuators on the housing 202. In fact, in some instances there may be no mechanical actuators on the housing 202 or the band 204. One or more soft actuators may be incorporated into cover 210. An hour hand 212 and a minute hand 214 may be presented by the user interface 120. Depending on the watch functionality, one or more additional hand indicators, e.g., a seconds hand or an alarm hand, may also be presented. Or, alternatively, the watch style may dictate a watch having only one hand. In this example, the user interface 120 includes a circular graphical display 216. However, the graphical display 216 may have a different shape or size depending on the configuration of the watch housing 202. For instance, the graphical display 216 may be square, rectangular, octagonal or a different geometric shape.

Returning to FIG. 1, the user interface 120 may include additional components as well. By way of example, one or more sensors 130 may be located on or within the watch housing. The sensors may include an accelerometer 132, e.g., a 3-axis accelerometer, and/or a gyroscope 134. Other sensors may include a magnetometer, a barometric pressure sensor, an ambient temperature sensor, a skin temperature sensor, a heart rate monitor, an oximetry sensor to measure blood oxygen levels, and a galvanic skin response sensor to determine exertion levels. Additional or different sensors may also be employed.

The user interface 120 may also include one or more speakers, transducers or other audio outputs 136. A haptic interface or other tactile feedback 138 is used to provide non-visual and non-audible information to the wearer. And one or more cameras 140 can be included on the housing, band or incorporated into the display.

The smartwatch 100 also includes a position determination module 142, which may include a GPS subsystem 144 or other positioning system components. Information from the accelerometer 132, gyroscope 134 and/or from data received or determined from remote devices (e.g., wireless base stations or wireless access points), can be employed by the position determination module 142 to calculate or otherwise estimate the physical location of the smartwatch 100.

In order to obtain information from and send information to remote devices, the smartwatch 100 may include a communication subsystem 146 having a wireless network connection module 148, a wireless ad hoc connection module 150, and/or a wired connection module 152. While not shown, the communication subsystem 146 has a baseband section for processing data and a transceiver section for transmitting data to and receiving data from the remote devices. The transceiver may operate at RF frequencies via one or more antennae. The wireless network connection module 158 may be configured to support communication via cellular, LTE, 4G and other networked architectures. The wireless ad hoc connection module 150 may be configured to support Bluetooth®, Bluetooth LE, near field communications, and other non-networked wireless arrangements. And the wired connection 152 may include a USB, micro USB, USB type C or other connector, for example to receive data and/or power from a laptop, tablet, smartphone or other device.

Figure 3:
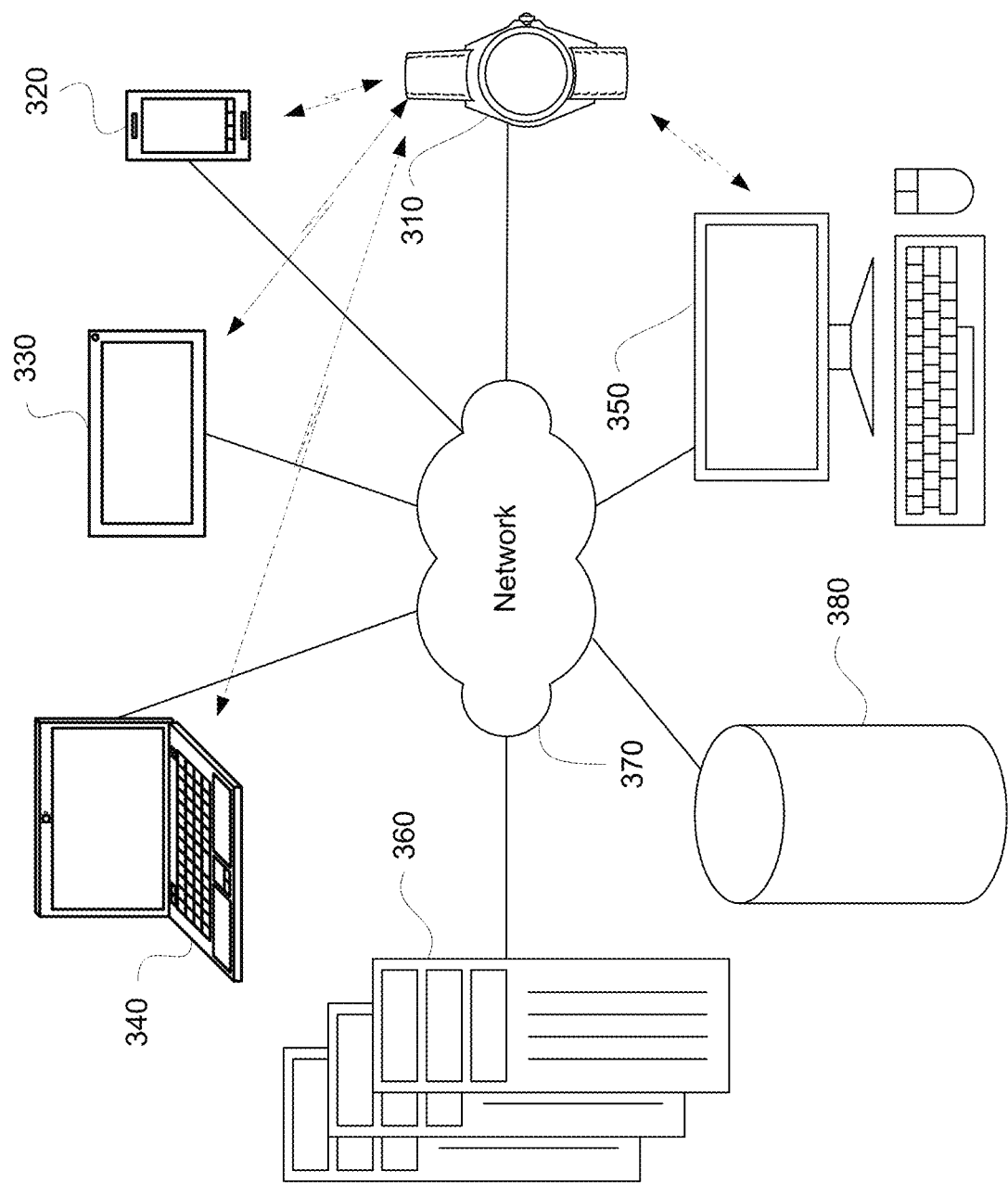
FIG. 3 is an example pictorial diagram of a networked or ad hoc system in accordance with aspects of the disclosure.

FIG. 3 is a pictorial diagram of an example system 300 that includes one or more smartwatches 310 or other wearable personal devices, as well as remote user devices such as smartphone 320, tablet computer 330, laptop computer 340, desktop PC 350 and a remote server system 360 connected via a network 370. System 300 may also include one or more databases 380, which may be operatively associated with the server system 360. Although only a few devices are depicted for simplicity, the system 300 may include significantly more. Each client device and the server system may include one or more processors, memory, data and instructions. Such processors, memories, data and instructions may be configured similarly to one or more processors, memory, data, and instructions of computing device 110. The smartwatch(es) 310 may also communicate directly with smartphone 320, tablet computer 330, laptop computer 340 and/or desktop PC 350, for instance via an ad-hoc arrangement or wired link, as shown by the dash-dot arrows. The smartwatch(es) may obtain data, instructions, apps or other information from any of the remote devices, and may use such information when communicating with the user via the user interface of the watch. For instance, an app on smartphone 320, tablet 330 or laptop 340 may provide information to or control what is presented to the user on the smartwatch 310. This can include email, calendar or other content.

Returning to FIG. 1, the smartwatch 100 also includes a display system 154 that is configured to generate content for display to the user via the graphical display 128, as well as an internal clock(s) 156 and a power source(s) 158. One or more clocks provide timing information, which can be used for timekeeping, time measurement for apps and other programs run by the smartwatch, and basic operations by the computing device(s) 110, GPS 144 and communication subsystem 146. The one or more power sources 158 provide power to the various components of the smartwatch. The power source(s) 158 may include, e.g., a battery, winding mechanism, solar cell or combination thereof. The computing devices may be operatively couples to these and other subsystems and components via a wired bus or other link, including wireless links.

The display system 154 includes a non-emissive display element 160, which is used in conjunction with one or more other components, such as light layer 162 and/or an emissive display element 164 which may be used as a mask layer.

The non-emissive display element 160 may be (but is not necessarily) bi-stable, which means that it does not require power to maintain the displayed information. In one example, the non-emissive display element may be an electronic ink (E-ink) or other type of electrophoretic display element. In another example, the non-emissive display element may be a liquid crystal display (LCD) without backlight, although other types of non-emissive display elements may also be employed.

The non-emissive display element 160 may be arranged as a circle or other shape depending on the overall appearance of the smartwatch such as shown in FIG. 2, a different wearable configuration, or other type of client device. Depending on the size and shape of the display, different resolutions and colors or greyscales may be employed. For instance, the resolution may be 180×180, 240×240, 960×540, 1448×1072, 1200×1600, or higher or lower. The bit depth may be, e.g., 1-bit, 2-bit, 4-bit or more. If greyscale is used instead of a color palette, the greyscale may be, e.g., black and white, 4 greyscales, 16 greyscales or more or less.

The light layer 162 is configured to provide lighting to the graphical display 128 as content is rendered by the non-emissive display element 160 and/or the emissive display layer 164. For instance, the light layer 162 may comprise one or more light pipes that direct illumination from one or more light sources to particular regions or the entire surface of the graphical display. In this case, the one or more light sources may be light emitting diodes (LEDs). Each LED may be coupled or otherwise connected to a single light pipe, or to multiple light pipes, either directly or indirectly. In some architectures, the light pipes of the light layer 162 are employed with only the non-emissive display element. In other architectures, the light pipes or other front light configuration are used in combination with both the non-emissive display element and the emissive display element (e.g., mask), as discussed further below.

One example of the emissive display element 164 is a transparent organic light emitting diode (TOLED or transparent OLED) layer. Both active matrix LEDs (AMOLED) and passive matrix LEDs (PMOLED) can be made transparent, although PMOLEDs may be able to achieve higher transparency given fewer electrical components in the matrix. Other types of emissive display elements may also be employed, including LCDs with backlighting. The emissive display element may be greyscale, multi-color or a full color display of, e.g., 6-bit, 8-bit or 16-bit resolution (or more).

Example Architectures

Various architectures may be employed with aspects of the technology to provide chromatics and/or illumination in conjunction with content rendered by a non-emissive display. Examples of these architectures are detailed below in view of the accompanying illustrations.

Figure 4A:
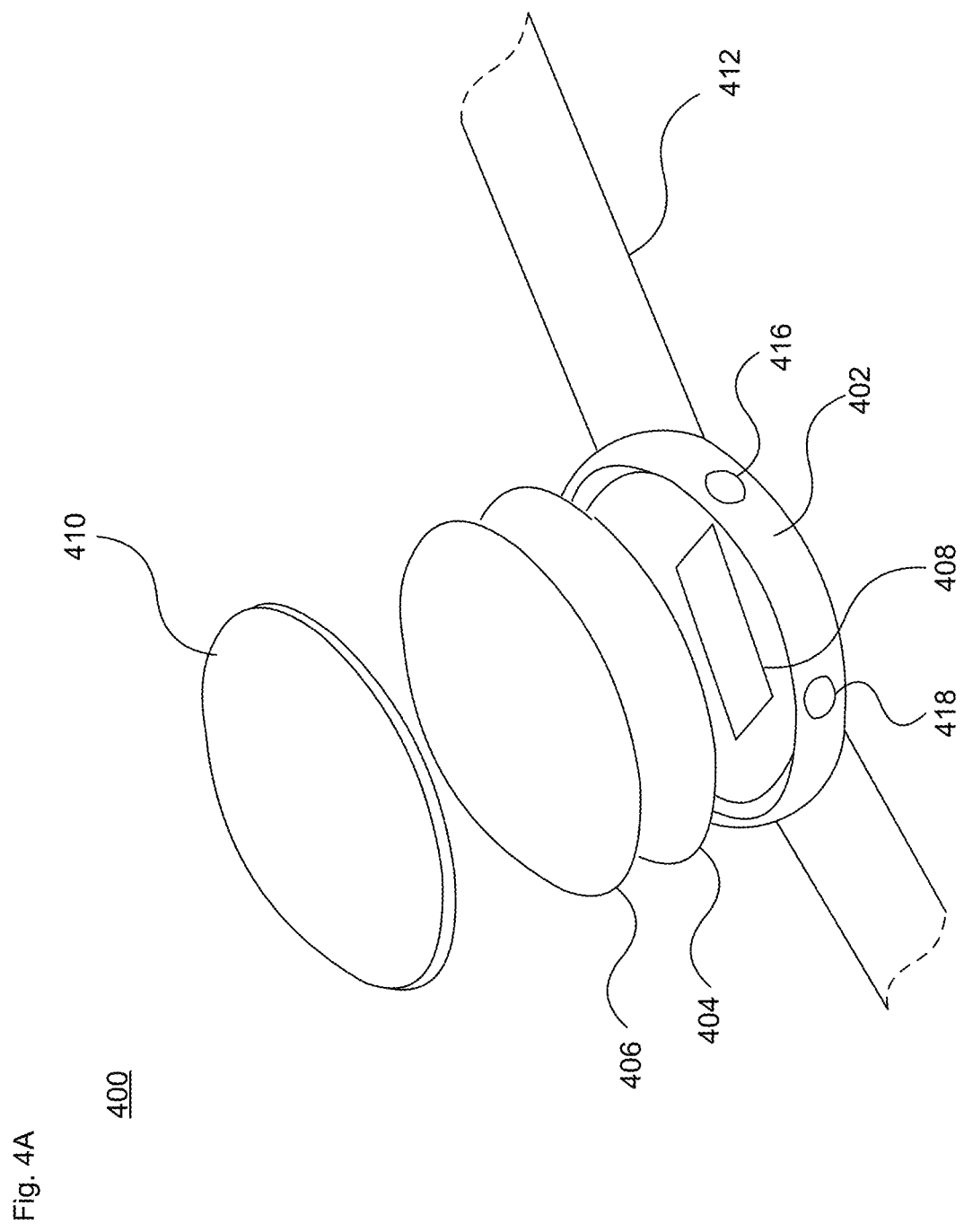
FIGS. 4A-C illustrate architectures for enhanced displays in accordance with aspects of the disclosure.

FIG. 4A is an exploded view of an example smartwatch 400 in accordance with aspects of the disclosure. Housing 402 is arranged to receive a non-emissive display element 404 and a light layer 406, as well as a printed circuit board (PCB) 408, on which may reside the processors and other components of the smartwatch described above with regard to FIG. 1. A cover 410, such as a transparent glass or plastic cover 410, is arranged to overly the display system, and these components may form graphical display 128 of FIG. 1. A band 412 is affixed to the housing 402. And as shown, one or more mechanical actuators, e.g., tactile buttons 414 and 416, may be disposed on the housing 402 and operatively coupled to the PCB 414.

Figure 5A:
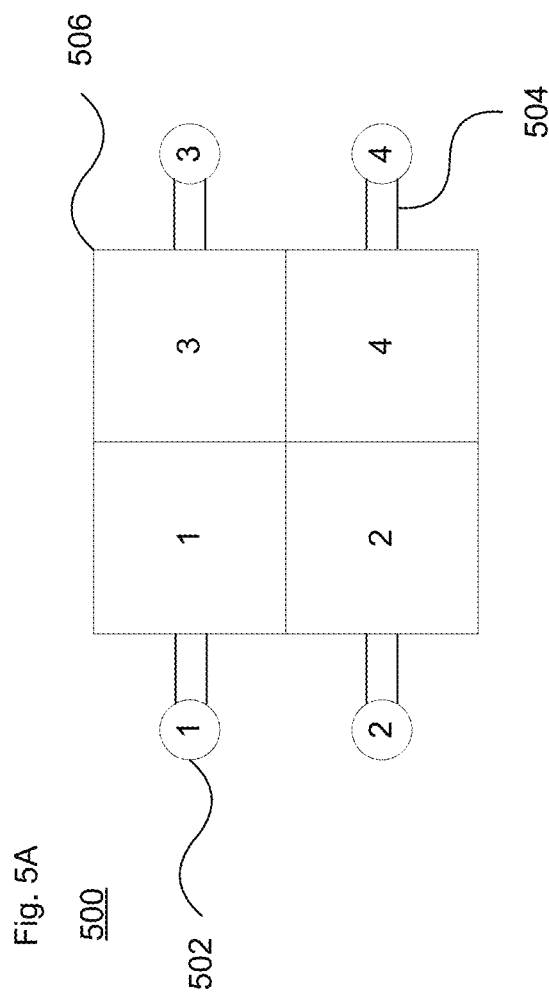

In this configuration, the light layer 406 employs a set of light pipes to direct individual LED lights to different parts of the display screen. Here, light layer 406 is disposed "above" the non-emissive display element, between the non-emissive display element and the cover. As shown in example 500 of FIG. 5A, four LEDs 502 are connected to four light pipes 504 that each color a quadrant 506 on a rectangular screen. The quadrants may be regions of the display, where each region includes one or more pixels.

Figure 5B:
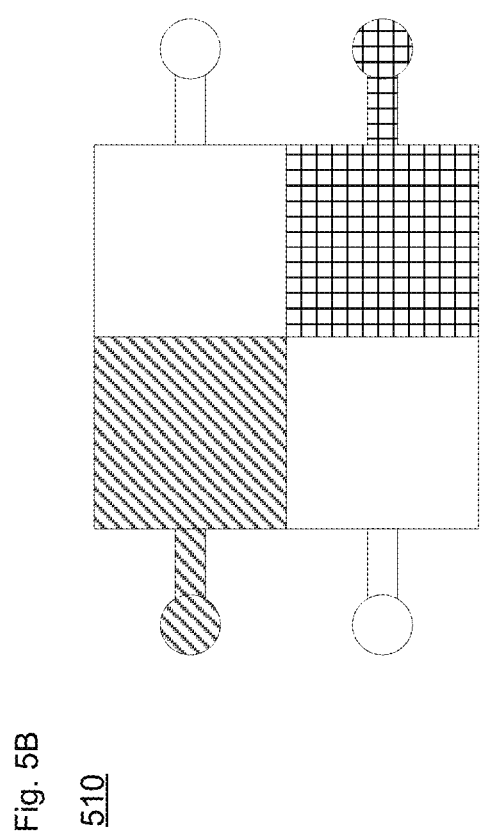
Figure 5C:
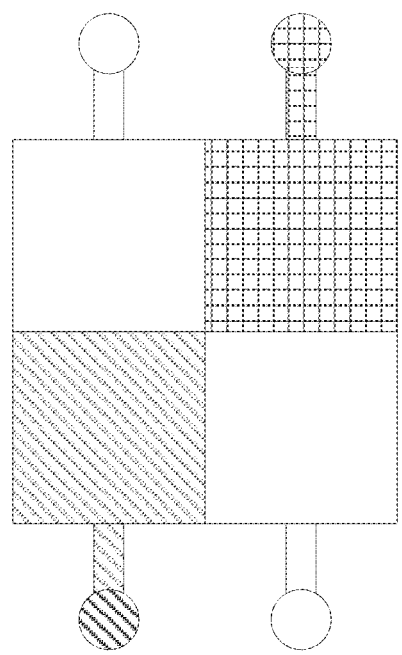

This allows for binary control (e.g., on/off) as shown by example 510 of FIG. 5B. Here, quadrants 1 and 4 may be illuminated by light pipes coupled to corresponding LEDs 1 and 4. This configuration also enables the display system to provide continuous intensity control as shown by example 520 of FIG. 5C. Here, the intensity in quadrants 1 and 4 has been varied as indicated by the shading and cross-hatching.

Intensity control may be provided, for instance, by modulating the voltage of the LEDs, for instance by a pulse width modulation (PWM) signal from one or more of the processors.

Figure 5D:
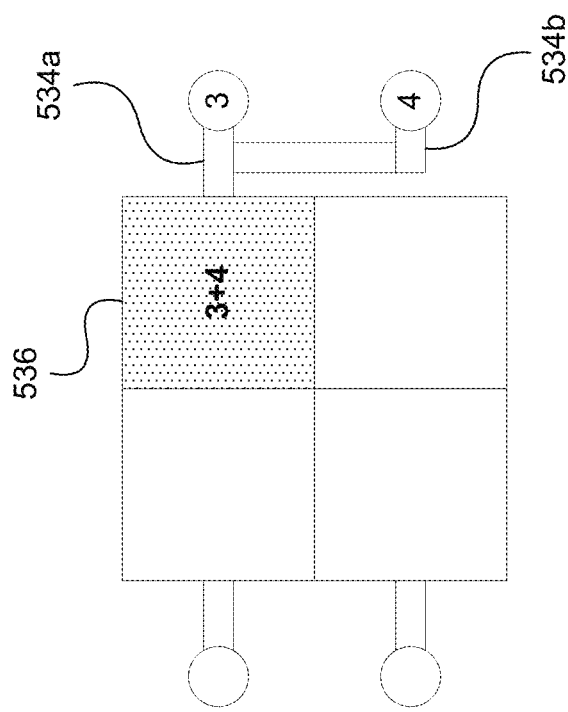

Multiple LEDs can be connected to a single light pipe to increase intensity or to increase light efficiency over a given area. FIG. 5D illustrates one example 530. Here, light pipes 534a and 534b from LEDs 3 and 4, respectively, are coupled together. This enables the illumination in quadrant 3 to be increased, such as by summing the intensities from LEDs 3 and 4 together, as shown in shaded quadrant 536.

Similar to the example of FIG. 5D, this arrangement may be employed to mix colors. FIG. 5E illustrates an example 540, in which LEDs 542a and 542b provide different colors. The outputs of these LEDs are combined by light pipe element 544, which results in a color 546 in the given quadrant that is the result of the combination of colors from the LEDs.

A given light source can also be connected to multiple light pipes. An example 550 is shown in FIG. 5F. Here, the light sources on the left hand side are the only light source for a given quadrant (a 1:1 relationship). In contrast, the light sources on the right hand side are used to illuminate multiple quadrants in conjunction with another light source (e.g., a 2:1 or N:1 relationship). Here, for instance, LED 552b has one connection via light pipe 554b to quadrant 4. LED 552b is the only light source illuminating that quadrant, resulting in illumination intensity and/or color 556b. However, LED 552 is also coupled to quadrant 3 via light pipe 554a along with LED 552a. This enables combining intensities and/or colors as shown by 556a.

Such configurations can use different colors and intensities to achieve various effects. For instance, red could indicate a warning, whereas blue could indicate a new text message or other content of interest. Increasing the intensity could indicate an update to a notification, while decreasing the intensity could indicate a period of time has elapsed without an update. And while these examples are presented with 4 light sources, 4 light pipes and 4 quadrants, there may be more or fewer of each of the light sources, light pipes and regions of the display.

Figure 4B:
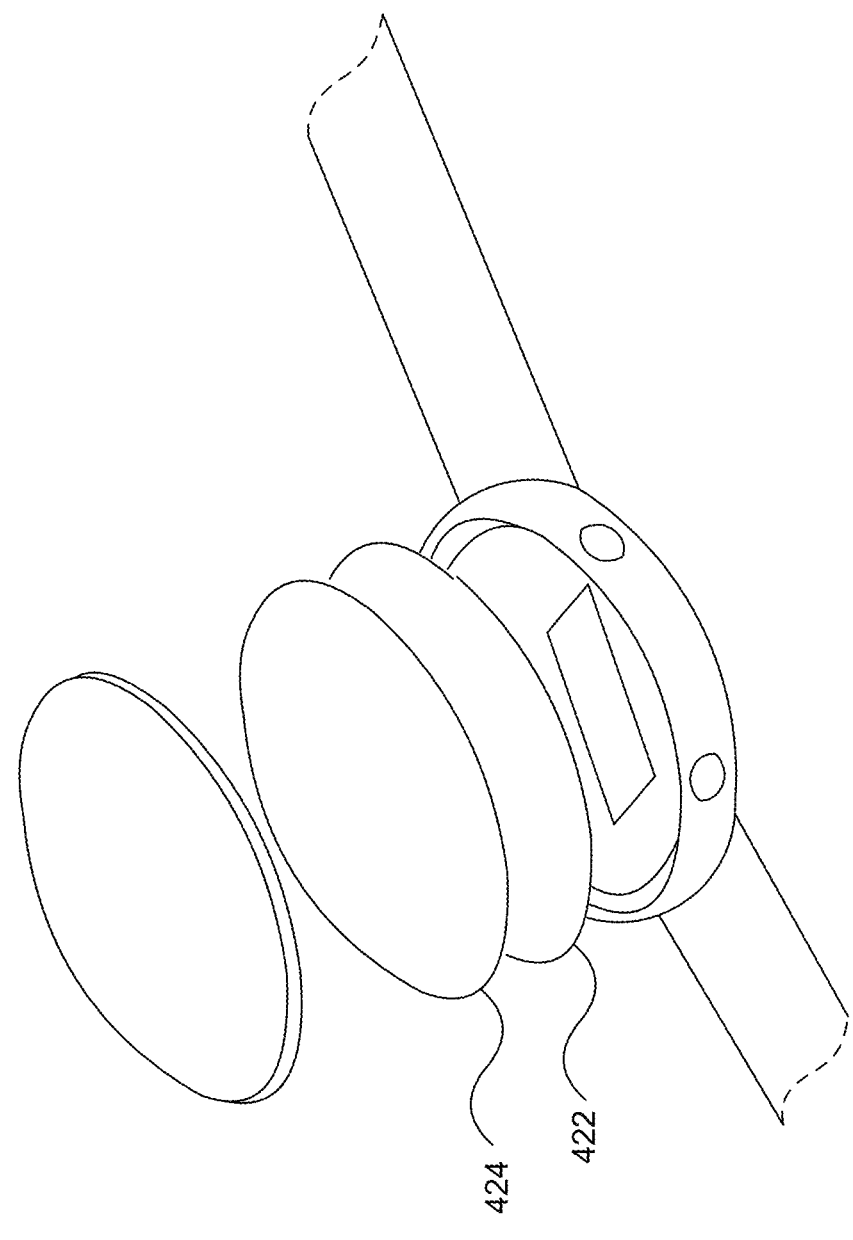

FIG. 4B is an exploded view of an example smartwatch 420 in accordance with additional aspects of the disclosure. The housing is arranged to receive a non-emissive display element 422 and a transparent emissive display element 424, such as a TOLED. This example 420 also includes the other components, such as the PCB, discussed above with regard to FIG. 4A.

As shown, the TOLED 424 is overlaid on the non-emissive display element 422, which enables the display system to provide per-pixel illumination and color control. For example, each pixel in the TOLED can provide per-pixel illumination, highlighting and color enhancement to the to the text, imagery or other content presented by the non-emissive display element.

Figure 6A:
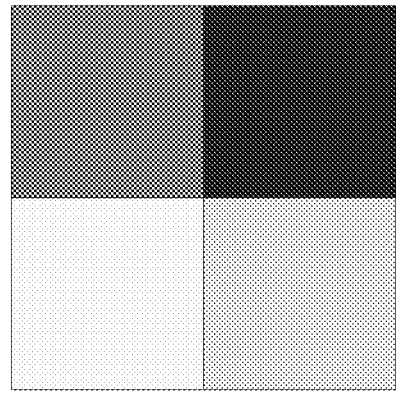
FIGS. 6A-6C illustrate an example of display augmentation in accordance with aspects of the disclosure in view of FIG. 4B.
Figure 6B:
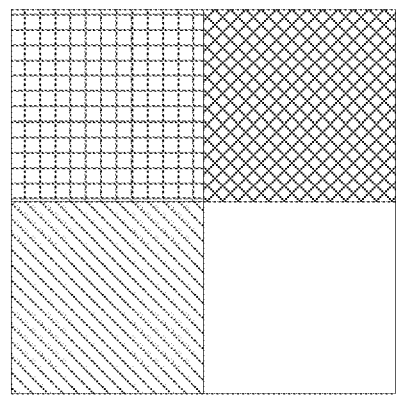
Figure 6C:
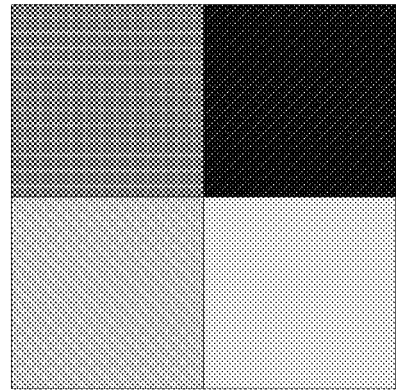

An example scenario is shown in FIGS. 6A-C. FIG. 6A illustrates a non-emissive display 600 having 4 quadrants (e.g., 4 pixels), each with a different appearance. The transparent OLED 610 of FIG. 6B has 4 corresponding quadrants, so that each quadrant (e.g., pixel) in the transparent OLED is configured to provide per-pixel illumination, highlighting and/or color modification for the underlying non-emissive display region. For instance, FIG. 6C illustrates one example 620 of resultant output by the display system, in which the per-pixel modifications have been made.

Figure 4C:
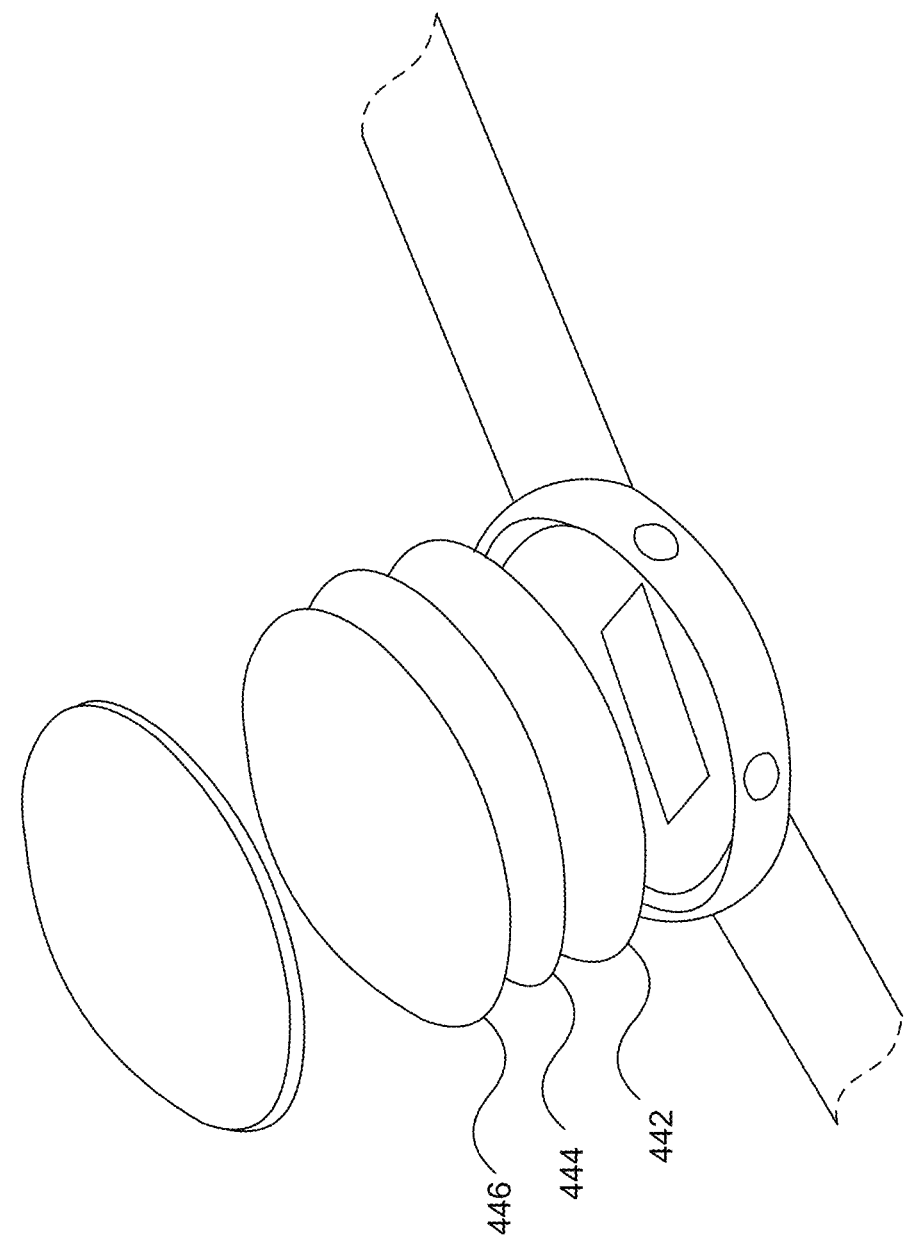

FIG. 4C is an exploded view of an example smartwatch 440 in accordance with further aspects of the disclosure. The housing is arranged to receive a non-emissive display element 442, a mask layer 444, such as a liquid crystal element with corresponding polarizers, and a front light element 446. This example 440 also includes the other components, such as the PCB, discussed above with regard to FIG. 4A.

As shown, the mask layer 444 overlies the non-emissive display element 442, so that it is disposed between the non-emissive display element and the cover. In this architecture, the front light element 446 overlies the mask layer 444, so that it is disposed between the mask layer and the cover. Here, the mask layer is able to control how much light reaches the non-emissive display element. In an alternative arrangement, the front light element (e.g., one or more light guides) is disposed between the non-emissive display element and the mask layer. Here, the mask layer controls the amount of light emitted by the display system which would be seen by the wearer or other user. Both of these configurations are capable of providing per-pixel illumination control.

The mask layer can be used to block or pass through polarized light for individual per-pixel addressing. The mask layer can also be modulated for per-pixel intensity control. Such modulation would involve turning a specific part (or all) of the mask layer on and off rapidly, such as several or tens of times per second. The ratio of on to off controls the transparency of the mask layer.

Figure 7B:
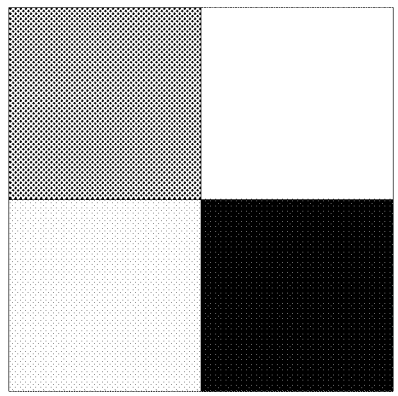
FIG. 7A-7C illustrate an example of display augmentation in accordance with aspects of the disclosure in view of FIG. 4C.
Figure 7A:
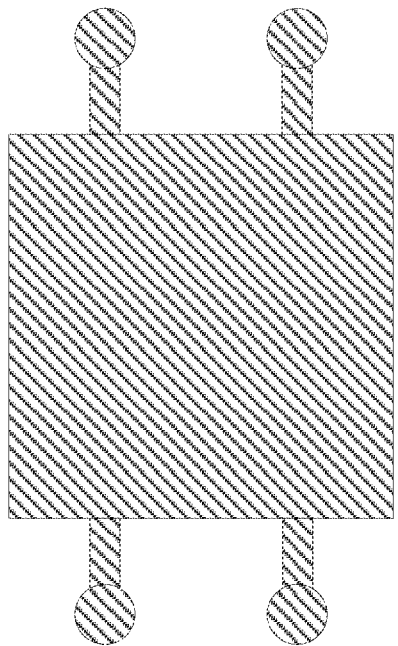
Figure 7C:
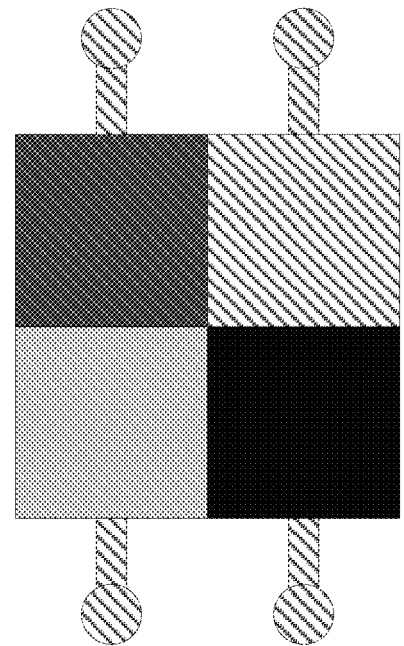

An example scenario is shown in FIGS. 7A-C. FIG. 7A illustrates light element 700, which may be configured to illuminate the entire display area or one or more regions of the display area. Mask layer 710 is shown having 4 quadrants (e.g., 4 pixels), each with a different appearance. As noted above, the mask layer 710 may comprise a liquid crystal component with corresponding polarizers. These overlays on top of the non-emissive display element are able to augment the appearance of the content rendered by the non-emissive display element. For instance, FIG. 7C illustrates one example 720 of resultant output by the display system, in which the per-pixel modifications (e.g., illumination control) have been made.

Example Augmentation Scenarios

Figure 8B:
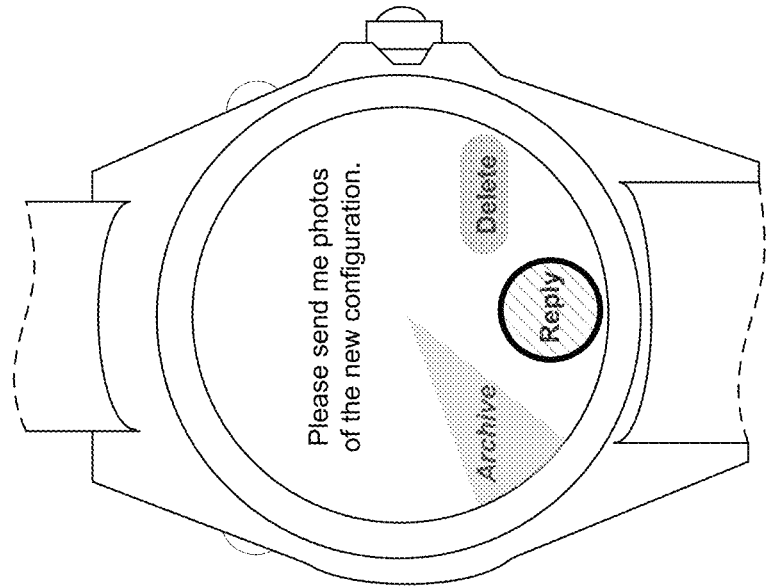
FIGS. 8A-8B illustrates examples of content augmentation in accordance with aspects of the disclosure.
Figure 8A:
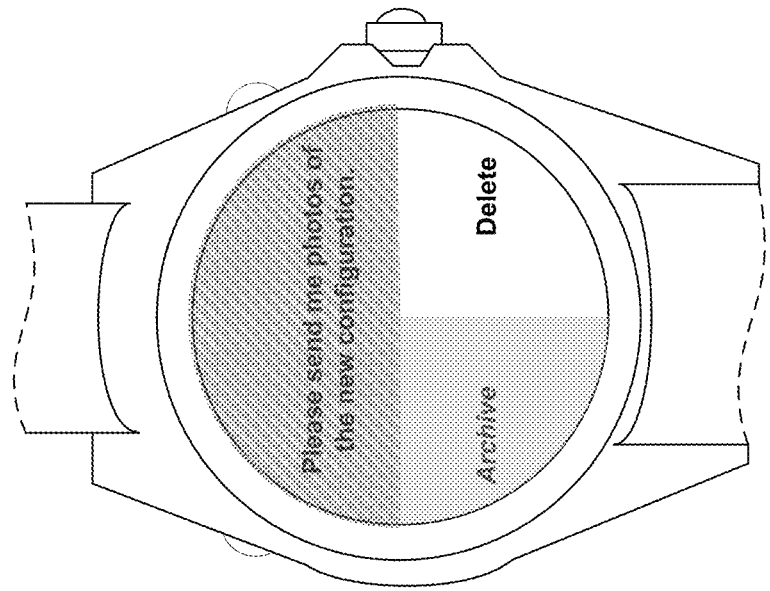

Various use cases and operating scenarios may take advantage of the architectures and configurations described above. FIGS. 8A and 8B illustrate two possible situations. As shown in FIG. 8A, content items are presented on the graphical display by the underlying display system. For instance, an email, text, alert or other notification may be presented on the display. In this example, text of the notification is presented along an upper half of a smartwatch display. Options for managing the notification are presented in the lower half of the display. Other configurations and layouts for the content are possible.

The text and other displayed elements (e.g., icons, imagery, etc.) may be rendered by the non-emissive display layer. Any of the architectures and arrangements discussed above (see FIGS. 4-7) may be employed to augment these displayed elements, such as by increasing (or decreasing) the illumination intensity or changing the color. Thus, in this example, the notification text is shown with a first shading effect to indicate a first color or intensity, the "Archive" text is shown with a second shading effect to indicate a second color or intensity, and the "Delete" text is shown with a third shading effect (e.g., no change) to indicate a third color or intensity. Thus, quadrants, areas or other regions of the graphical display can be emphasized or deemphasized under the control of the processor(s).

FIG. 8B illustrates a situation with more granularity, with per-pixel control to further enhance the content rendered by the non-emissive display element. As shown here, individual options or specific pixels are highlighted or otherwise emphasized. For instance, a sector or triangular region including "Archive" can be shaded to illustrate that option. An oval region including "Delete" can be highlighted in a different way (e.g., different colors or intensity) to show the wearer that option. And "Reply" may be emphasized with a circle or other graphic, and may have a higher (or lower illumination) or a specific color to indicate that is the current (e.g., default) option. Other combinations and arrangements are possible, and these are merely a few examples. Various additional examples are discussed below.

Circadian lighting could color the screen differently in the morning, day, and evening/night. At night, different areas of the screen can have "permanent" (e.g., until morning) versus "temporary" illumination with per-pixel intensity control.

Information from different sources could be placed in dedicated areas of the display screen, where content elements would be colored differently depending on the source and/or the location on the display.

Colored illumination of small circles (or other shapes) could replace the use of indicator LEDs, for example used for charging or notifications of new messages. In this case, because the circles have text capabilities, they could, e.g., indicate charging percentage or unread message count. Colored illumination of the display could also be an effective way to communicate warnings, such as low battery, or too high heartrate.

In a further example, preferred or default options in menus can be illuminated as a highlight. And according to another example, the processor(s) could control the display system by directing a "steerable light" onto the non-emissive surface. Here, instead of lighting up the whole display with a dedicated sidelight or backlight, the display system renders a steerable light to create a circle, rectangle, triangular or sector area (for example) around a piece of information or an icon, for instance as shown according to FIG. 8B. Such a technique may save power in addition to being a discreet way to indicate important information to the wearer.

The features and approach from each of these scenarios and examples may be applied to any of the other scenarios and examples.

Figure 9:
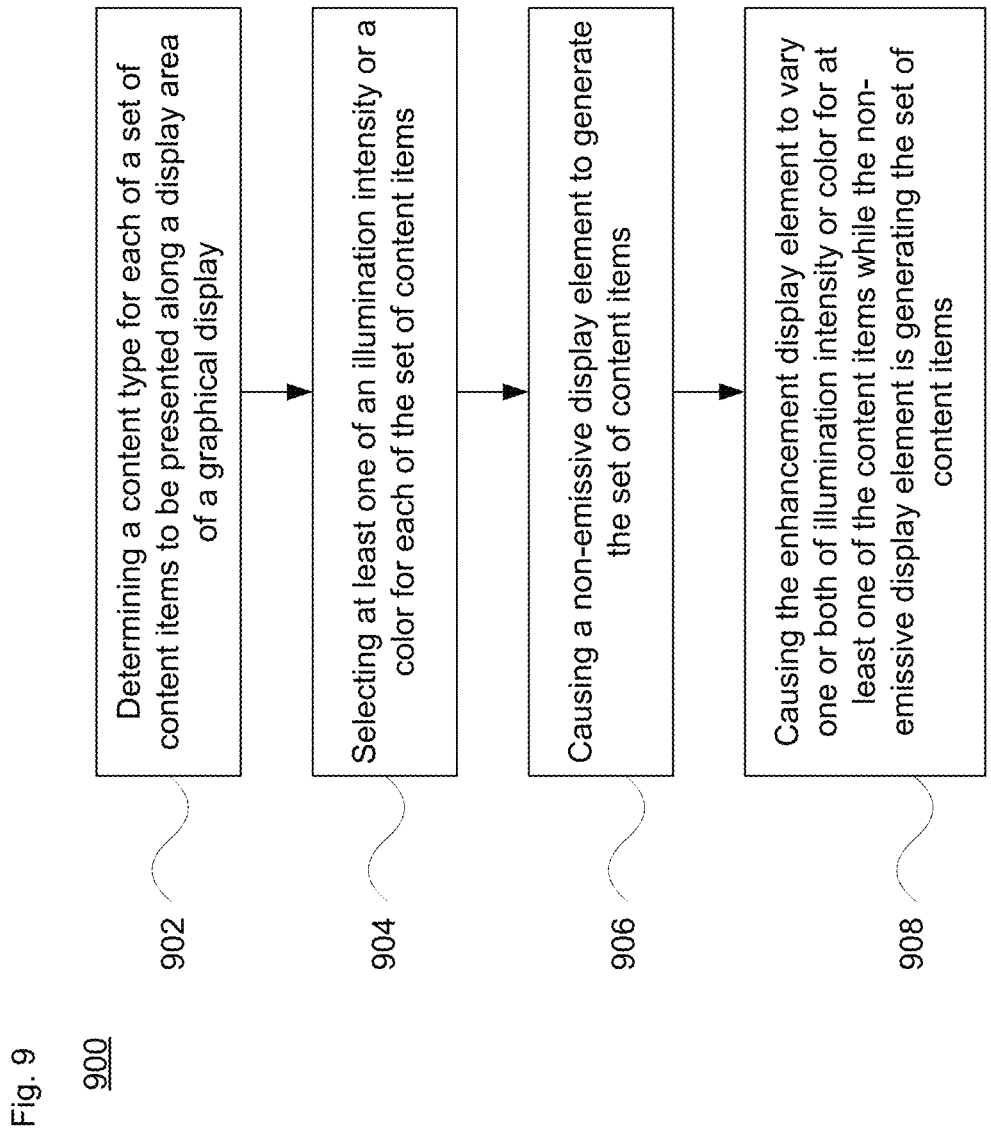
FIG. 9 is a flow diagram of a method of operating an augmented graphical display in accordance with aspects of the disclosure.

FIG. 9 illustrates a flow diagram 900 of an exemplary method of operating a display system as discussed herein. At block 902, one or more processors of the device determine a content type for each one of a set of content items, which are to be presented along a display area of a graphical display (e.g., of a smartwatch or other wearable client device). For example, the content type may be whether the content item is a static or dynamic element, such as whether it does not change (e.g., while an app is running), changes slowly (e.g., over tens of seconds, minutes or hours), changes or updates quickly (e.g., within 1-10 seconds), flashes (e.g., changing one or more times a second) or requires a specific refresh rate. The content type may, in addition or alternatively, include other factors, such as where the item of content is derived from (e.g., received from another device, generated locally, such as by an app running on the device, or is received as input from a user (e.g., a wearer of a smartwatch). Additional content type factors may be, for instance, whether the item of content is time sensitive or should be presented differently depending on the time of day.

At block 904, the method includes selecting at least one of an illumination intensity or a color for each content item in the set of content items. At block 906, the method also includes causing a non-emissive display element to generate the set of content items. And at block 908, the method further includes causing the enhancement display element to vary one or both of illumination intensity or color for at least one of the content items. This is done while the non-emissive display element is generating the set of content items. In this manner, the enhancement display element augments the content rendered by the non-emissive display element. As discussed above, the enhancement display element may have different architectures and configurations that may be employed to achieve the augmentation.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An electronic display device configured to present content to a user, the device comprising:
 a housing having a first side and a second side opposite the first side, the first side having a display area arranged to be viewable by the user during use;
 a user interface subsystem including one or more actuator elements configured to receive input from the user;
 a non-emissive display element disposed along a first area of the housing, the non-emissive display element being configured to present content to the user;
 an enhancement display element disposed along a second area of the housing, the enhancement display element being configured to vary at least one of an illumination intensity or a color of content to be presented to the user, the enhancement display element being arranged closer to the first side of the housing than the non-emissive display element; and
 one or more processors received within the housing and operatively coupled to the user interface subsystem, the non-emissive display element and the enhancement display element, the one or more processors being configured to:
  determine a content type for each one of a set of content items to be presented to the user;
  select at least one of the illumination intensity or the color for each one of the set of content items;
  cause the non-emissive display element to generate the set of content items; and
  cause the enhancement display element to vary one or both of the illumination intensity or color for at least one of the set of content items while the non-emissive display element generates the at least one of the set of content items;
 wherein the second area is disposed closer to the first side than the first area in a stacking direction.

2. The device of claim 1, wherein:
 the enhancement display element comprises a plurality of light pipes and a plurality of illumination display elements,
 each one of the plurality of light pipes is optically coupled to at least one of the plurality of illumination display elements; and
 each light pipe is configured to direct light to a selected portion of the display area.

3. The device of claim 2, wherein the enhancement display element provides at least one of binary illumination intensity control or binary color control over a selected portion of the display area.

4. The device of claim 2, wherein:
 multiple ones of the plurality of illumination display elements are optically coupled to a given one of the plurality of light pipes, and
 the one or more processors are configured to cause the enhancement display element to vary one or both of the illumination intensity or the color through additive or subtractive properties of the multiple illumination display elements.

5. The device of claim 2, wherein the one or more processors are configured to route input from at least one of the illumination display elements to multiple portions of the display area.

6. The device of claim 2, wherein the illumination display elements comprise a front light element, a polarizer and one or more liquid crystal (LC) elements.

7. The device of claim 1, wherein:
 the enhancement display element comprises a transmissive display element configured to be transparent in a first mode and non-transparent in a second mode; and
 the one or more processors are configured to cause portions of the transmissive display element to change between the first mode and the second mode to vary one or both of the illumination intensity or the color for selected content to be presented along the display area.

8. The device of claim 7, wherein the transmissive display layer comprises a transparent organic light emitting diode (OLED) layer.

9. The device of claim 8, wherein the transparent OLED is configured to provide per-pixel illumination and color control for the selected content.

10. The device of claim 1, wherein:
 the enhancement display element comprises a light layer and a mask layer, and
 the one or more processors are configured to cause the light layer and the mask layer to vary one or both of the illumination intensity or the color for selected content to be presented along the display area.

11. The device of claim 10, wherein:
 the light layer encompasses an entirety of the display area; and
 the mask layer is segmented into a plurality of non-overlapping or overlapping regions, each region associated with a respective portion of the display area.

12. The device of claim 11, wherein the mask layer comprises a liquid crystal (LC) element.

13. The device of claim 12, wherein the light layer is disposed between the mask layer and the first side of the housing.

14. The device of claim 12, wherein the light layer is disposed between the mask layer and the non-emissive display element.

15. A method of operating a graphical display of a client device, the graphical display including a non-emissive display element and an enhancement display element, the enhancement display element being arranged between the non-emissive display element and a viewable side of the client device defining a display area, the method comprising:

determining, by one or more processors of the client device, a content type for each one of a set of content items to be presented for viewing along the display area;

selecting, by the one or more processors, at least one of an illumination intensity or a color for each one of the set of content items;

causing, by the one or more processors, the non-emissive display element to generate the set of content items for display; and causing, by the one or more processors, the enhancement display element to vary one or both of the illumination intensity or the color for at least one of the set of content items while the non-emissive display element generates the at least one of the set of content items.

16. The method of claim 15, wherein the enhancement display element provides at least one of binary illumination intensity control or binary color control over a selected portion of the display area.

17. The method of claim 15, wherein:
the enhancement display element comprises a plurality of illumination display elements, and
causing the enhancement display element to vary one or both of the illumination intensity or the color includes causing selected ones of the plurality of illumination elements to vary one or both of the illumination intensity or the color through additive or subtractive properties of the selected ones of the plurality of illumination display elements.

18. The method of claim 15, wherein causing the enhancement display element to vary one or both of the illumination intensity or the color includes routing input from at least one illumination display element to multiple portions of the display area.

19. The method of claim 15, wherein:
the enhancement display element comprises a transmissive display element configured to be transparent in a first mode and non-transparent in a second mode; and
causing the enhancement display element to vary one or both of the illumination intensity or the color includes causing portions of the transmissive display element to change between the first mode and the second mode to vary one or both of the illumination intensity or the color for selected content to be presented along the display area.

20. The method of claim 15, wherein:
the enhancement display element comprises a light layer and a mask layer, and
causing the enhancement display element to vary one or both of the illumination intensity or the color includes causing the light layer and the mask layer to vary one or both of the illumination intensity or the color for selected content to be presented along the display area.

* * * * *